United States Patent
Flossbach et al.

(10) Patent No.: US 11,454,503 B2
(45) Date of Patent: Sep. 27, 2022

(54) UPDATING A DIGITAL MAP

(71) Applicant: Bayerische Motoren Werke Aktiengesellschaft, Munich (DE)

(72) Inventors: Sascha Flossbach, Freising (DE); Dirk Leistner, Munich (DE); Werner Richter, Unterhaching (DE); Dimitri Schechter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 155 days.

(21) Appl. No.: 16/436,261

(22) Filed: Jun. 10, 2019

(65) Prior Publication Data
US 2019/0293436 A1 Sep. 26, 2019

Related U.S. Application Data

(63) Continuation of application No. PCT/EP2017/081521, filed on Dec. 5, 2017.

(30) Foreign Application Priority Data

Dec. 13, 2016 (DE) ...................... 10 2016 224 845.6

(51) Int. Cl.
*G01C 21/34* (2006.01)
*G08G 1/123* (2006.01)
(Continued)

(52) U.S. Cl.
CPC ............ *G01C 21/32* (2013.01); *G06F 16/29* (2019.01); *G08G 1/0112* (2013.01); *G08G 1/096775* (2013.01)

(58) Field of Classification Search
None
See application file for complete search history.

(56) References Cited

U.S. PATENT DOCUMENTS 6,643,584 B1 11/2003 Ikeuchi et al.
8,803,920 B2 * 8/2014 Kalai ...................... G06F 16/29
345/660
(Continued)

FOREIGN PATENT DOCUMENTS

DE 103 18 179 A1 3/2004
DE 10 2015 203 929 A1 9/2016
(Continued)

OTHER PUBLICATIONS

PCT/EP2017/081521, International Search Report dated Feb. 26, 2018 (Two (2) pages).
(Continued)

*Primary Examiner* — Mahmoud S Ismail
(74) *Attorney, Agent, or Firm* — Crowell & Moring LLP

(57) ABSTRACT

The invention relates to a method for updating a digital map of a mobile navigation system, in particular a navigation system of a motor vehicle, wherein the updating of map data is improved with respect to the availability of current map data and the minimization of the data volume to be transferred (and thus also the avoidance of the updating of map data that are not required at all). For this purpose, a geographic region comprised by the digital map is divided into a plurality of regions, wherein map data of the digital map represent respective regions, wherein at least one of the regions has a first boundary line directly surrounding the region, wherein the region has an additional boundary line, which surrounds the region with greater distance than the first boundary line at least in some sections. The method comprises the following steps: determining a geographic position of the navigation system, checking a first condition of whether the position of the navigation system lies on or within the additional boundary line, and, if the first condition arises, updating the map data of the region.

14 Claims, 2 Drawing Sheets

(51) Int. Cl.
*G01C 21/32* (2006.01)
*G06F 16/29* (2019.01)
*G08G 1/01* (2006.01)
*G08G 1/0967* (2006.01)

(56) References Cited

U.S. PATENT DOCUMENTS

| | | | |
|---|---|---|---|
| 8,849,942 B1* | 9/2014 | Foster | G09B 29/106 |
| | | | 709/213 |
| 8,886,715 B1* | 11/2014 | Zhu | H04L 67/42 |
| | | | 709/203 |
| 9,389,088 B2* | 7/2016 | Kalai | G01C 21/3415 |
| 2003/0220735 A1* | 11/2003 | Nimura | G09B 29/10 |
| | | | 701/421 |
| 2006/0074547 A1* | 4/2006 | Kaufman | G01C 21/32 |
| | | | 701/451 |
| 2007/0126605 A1* | 6/2007 | Aleksic | G01C 21/32 |
| | | | 340/995.14 |
| 2007/0168121 A1 | 7/2007 | Adachi | |
| 2009/0281718 A1* | 11/2009 | Gibran | G01C 21/32 |
| | | | 701/532 |
| 2009/0326810 A1* | 12/2009 | Callaghan | H04L 67/289 |
| | | | 701/532 |
| 2011/0191285 A1* | 8/2011 | Sawai | G01C 21/32 |
| | | | 707/602 |
| 2012/0078493 A1* | 3/2012 | Schunder | G01C 21/34 |
| | | | 701/117 |
| 2012/0130944 A1* | 5/2012 | Masuda | G01C 21/32 |
| | | | 707/609 |
| 2013/0325317 A1* | 12/2013 | Pylappan | G01C 21/32 |
| | | | 701/409 |
| 2013/0325326 A1* | 12/2013 | Blumenberg | G01C 21/36 |
| | | | 701/428 |
| 2015/0156609 A1* | 6/2015 | Davis | H04W 4/021 |
| | | | 455/457 |
| 2015/0221216 A1* | 8/2015 | Stenneth | G08G 1/0141 |
| | | | 701/117 |
| 2016/0025497 A1* | 1/2016 | Baalu | H04L 67/12 |
| | | | 701/430 |
| 2016/0371326 A1* | 12/2016 | Gotoh | G06T 11/206 |
| 2016/0371801 A1* | 12/2016 | Dawson | G06F 16/29 |
| 2017/0122749 A1* | 5/2017 | Urano | G01C 21/20 |
| 2017/0307383 A1* | 10/2017 | Kubo | G01C 21/26 |
| 2021/0003405 A1* | 1/2021 | Choi | G05D 1/0274 |

FOREIGN PATENT DOCUMENTS

| | | |
|---|---|---|
| DE | 10 2015 206 519 A1 | 10/2016 |
| EP | 2 498 057 A1 | 9/2012 |
| WO | WO 2015/186025 A1 | 12/2015 |

OTHER PUBLICATIONS

German Search Report issued in German counterpart application No. 10 2016 224 845.6 dated Jul. 13, 2017, with Statement of Relevancy (Nine (9) pages).

* cited by examiner

UPDATING A DIGITAL MAP

CROSS REFERENCE TO RELATED APPLICATIONS

This application is a continuation of PCT International Application No. PCT/EP2017/081521, filed Dec. 5, 2017, which claims priority under 35 U.S.C. § 119 from German Patent Application No. 10 2016 224 845.6, filed Dec. 13, 2016, the entire disclosures of which are herein expressly incorporated by reference.

BACKGROUND AND SUMMARY OF THE INVENTION

The present invention relates to a method for updating a digital map of a mobile navigation system, and to a mobile navigation system and to a motor vehicle having such a navigation system.

Using mobile navigation systems, which are popular in particular in the form of a fixed component or retrofittable special accessory for motor vehicles, it is possible to determine the current geographical position and to calculate a route to a destination. For this calculation, navigation systems have digital maps stored in a data memory of the navigation system. In order that such digital maps are always as up-to-date as possible, there is the need to update a digital map as often and as extensively as possible. It is known to update digital maps by connecting a data carrier (for example a CD, a USB flash drive or the like) to the navigation system, on which data carrier updated map data are stored. Such a data carrier may either remain in the navigation system, that is to say replace the previous data carrier for the digital map, or its content may be copied to the data carrier for the digital map that is already situated in the navigation system.

Modern vehicles often have devices for wireless data communication with communication participants external to the vehicle. By way of example, vehicles may be configured so as to exchange data with the Internet via mobile radio networks. Such data communication devices open up a further possibility for updating a digital map stored in the vehicle, specifically by obtaining the updated map data via the mobile radio connection. Since the volume of data that is able to be transmitted via such a mobile radio connection is generally limited for technical and economic reasons, updating the entire digital map via a mobile radio connection is problematic.

It is therefore desirable to update only those parts of the digital map that are actually required in this way. To this end, it is known to divide the digital map into geographical regions. By way of example, in such a division of a map of Europe, each European country may constitute a region. The regions may however also be selected so as to be significantly more fragmented.

If the mobile navigation system is moved into the area of a particular region, then the map data for this region may be updated via the wireless data connection. This may comprise both loading the map data—not previously present in the navigation system—for the region for the first time, that is to say that map data for the region that are already present are also overwritten by more current map data for the region. The disadvantage of this procedure is that the updating procedure—depending on the volume of data to be transmitted and the data transmission rate—lasts a relatively long time, during which the updated map data are not yet available.

DE 10 2015 203 929 A1 proposes a method for updating map data in which the map data are divided into map tiles. Depending on a position of the vehicle, an update boundary and a trigger boundary are determined. It is checked whether all of the map tiles within the update boundary are current; if this is not the case, then the map data are updated. This method is performed again when the vehicle reaches the trigger boundary.

On the basis of the prior art, the problem arises of improving the updating of map data with regard to the availability of current map data, on the one hand, and minimizing the volume of data to be transmitted (and therefore also avoiding updating map data that are not at all required), on the other hand.

According to the invention, a method for updating a digital map of a mobile navigation system is proposed. This may in particular be a navigation system of a motor vehicle. It may also however be for example a navigation system configured as an independent device or a smartphone having a navigation functionality. A geographical area contained within the digital map is divided into a multiplicity of regions, wherein respective map data of the digital map each depict one of the regions. The regions may be geographical areas that are selected as desired. By way of example, regions may be formed by countries, districts or other political boundaries. Likewise, the size and shape of the regions may be selected independently of geographical possibilities, for example in the form of grid squares. It is possible but in no way necessary for various regions to have the same shape and/or size. It may even be advantageous to depict areas with a high density of map objects (for example urban areas) as regions having a relatively small surface area and areas with a low density of map objects (for example rural areas) as regions having a relatively large surface area.

According to the invention, at least one of the regions has a first boundary line directly surrounding the region. If the first boundary line is a closed line, then the area enclosed by the first boundary line forms the region. It is noted that the first boundary line does not necessarily have to be a closed line, even though this will advantageously be the case. If for example a region lies at the edge of a geographical area depicted by the digital map, then the boundary of the region may also result implicitly from the border of the geographical area depicted by the digital map.

According to the invention, the region has at least one further boundary line that at least sectionally surrounds the region at a greater distance than the first boundary line. The further boundary line in other words defines an area that is larger than the region but contains same. The excess area may also be referred to as a buffer zone. The buffer zone surrounds the region.

The method makes provision for a geographical position of the navigation system to be determined in a first step. It is then checked whether the position of the navigation system lies on or within the further boundary line. In other words, it is checked whether the navigation system is situated on or within the border with respect to the buffer zone. If this first condition is satisfied, the map data for the region are updated. This is performed in a known manner. By way of example, the map data may for this purpose be requested and then received from a data server, for example an Internet server, via a mobile radio connection of the navigation system or of the motor vehicle. There may also be provision for the respective version number of the map data present in the navigation system and/or in the data server to initially be transmitted via the data connection, in order to establish whether an update is absolutely necessary.

In other words, the invention thus makes it possible for the map data for a region to be requested and transmitted only if the navigation system is already situated in the region. The digital map is rather already updated when the border with respect to the buffer zone is crossed. There is then specifically a sufficient likelihood of the navigation system being situated on the way into the region. It therefore makes sense to update the map data for the region. On the other hand, the journey that the navigation system still has to cover through the buffer zone before reaching the region may be used in order to transmit the current map data.

Embodiments of the invention may make provision for the further boundary line to be a predetermined item of information contained in the digital map. In other words, the further boundary line may be a static item of information that may be predefined for example by the map producer or the producer of the navigation system.

Alternative embodiments of the invention may advantageously make provision for the further boundary line to be able to be determined by the navigation system. Particularly advantageously, the further boundary line may be determined depending on at least one property of the mobile data connection, in particular of the available data rate and/or of the navigation system (and/or of the motor vehicle). The further boundary line may in particular be determined such that the update is concluded at the expected time of reaching the first boundary line of the region. To determine this time, it is possible to take into account:
the volume of data to be transmitted,
the available data rate and
the remaining time until reaching the first boundary line of the region,
wherein this remaining time is able to be calculated in particular from a remaining journey length and an expected and/or previous average speed.

In one particularly advantageous refinement of the invention, at least two further boundary lines are provided. In this case, the region has a second boundary line that at least sectionally surrounds the region at a greater distance than the first boundary line. The region additionally has a third boundary line that at least sectionally surrounds the region at a greater distance than the second boundary line. In other words, the second and the third boundary line form two adjacent buffer zones around the region. In this refinement, a second condition is checked as to whether route guidance of the navigation system is active in an additional method step. The term route guidance is in this case understood to mean that function of the navigation system in which a destination is set and a route has been determined or is determined on the basis thereof.

If this is the case, then the first condition is checked with respect to the third boundary line. In other words, it is thus checked whether the position of the navigation system lies on or within the third boundary line.

By contrast, if the second condition is not satisfied, then route guidance of the navigation system is thus not active, and the first condition with respect to the second boundary line is thus checked. In other words, it is thus checked whether the position of the navigation system lies on or within the second boundary line.

It is thus distinguished in this refinement whether the navigation system is currently being used for route guidance. If this is the case, then the update is started earlier, specifically already when reaching the third boundary line (which indeed lies further from the region than the second boundary line). Since, in the case of activated route guidance, it is more likely that the navigation system is actually moving into the region, the updating may be started earlier, without the likelihood of an unnecessary update (unnecessary due to the navigation system not subsequently entering the region) being greatly increased. On the other hand, the fact that the update is started earlier increases the likelihood of the update having concluded upon reaching the first boundary line of the region.

It is explicitly pointed out that the update is started only at the time of reaching the third boundary line and not for instance already at an earlier time, even in the case of activated route guidance. This is also the case if the planned route lies in the buffer zone and/or in the region. A situation is thereby avoided whereby the map data for a region are unnecessarily updated, for example if the user of the navigation system (in particular the driver of the motor vehicle) deviates from the planned route.

In one particularly advantageous development, in the event that the second condition is satisfied, that is to say if the route guidance of the navigation system is active, a third condition is checked as to whether a planned journey route runs at least partly within the region. The step of updating the map data for the region is executed only if this is satisfied, and otherwise it is not.

If route guidance is activated, the travel route expected to be covered in the future by the navigation system is known. This knowledge may advantageously be used to perform the update of the digital map only if this is also necessary. If the planned journey route however leads into the buffer zone of the region but not into the region itself, then the map data for the region do not have to be updated.

In the last described embodiment, in other words, when route guidance is activated, if the third boundary line is crossed, no update is performed if the planned journey route does not lead into the region. There may however be provision for the map data for the region still to be updated, if and as soon as the position of the navigation system lies on or within the second boundary line. In other words, the update is then triggered in the same way as would be the case if the second condition were not to be satisfied, that is to say if route guidance were not to be activated. This may therefore be advantageous because the likelihood of the user of the navigation system entering into the region so as to deviate from the planned journey route increases when the second boundary line is crossed. This situation is catered for beforehand by an update already being performed.

Again advantageously, if the third condition is not satisfied, a fourth condition may be checked as to whether the position of the navigation system lies on or within the first boundary line. If the fourth condition is satisfied, the step of updating the map data for the region is executed. In this case, the user of the navigation system has deviated from the planned journey route, since the third condition has not been satisfied and the planned journey route accordingly does not run at least partly within the region. It makes sense to update the map data for the region at the latest when the first boundary line is crossed, that is to say when the navigation system is already situated in the region.

Further embodiments of the invention are explained below with reference to exemplary illustrations, in which Other objects, advantages and novel features of the present invention will become apparent from the following detailed description of one or more preferred embodiments when considered in conjunction with the accompanying drawings.

DETAILED DESCRIPTION OF THE DRAWINGS

Identical reference signs in the figures identify identical or functionally identical features of the illustrated embodiments of the invention. It is pointed out that the illustrated figures and the associated description are merely exemplary embodiments of the invention. Illustrations of combinations of features in the figures and/or the description of the figures should in particular not be understood to mean that the invention necessarily requires all of said features to be implemented. Other embodiments of the invention may contain fewer, more and/or other features. The scope of protection and the disclosure of the invention result from the appended patent claims and the complete description. It is additionally pointed out that the illustrations are basic illustrations of embodiments of the invention. The arrangement of the individual illustrated elements with respect to one another is selected only by way of example and may be selected differently in other embodiments of the invention.

Figure 1:
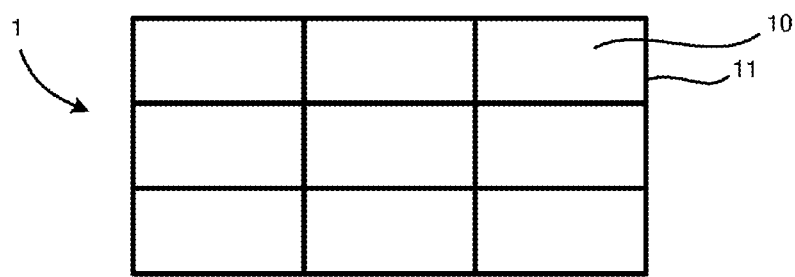
FIG. 1 shows a schematic illustration of a digital map divided into regions according to the prior art.

FIG. 1 shows a digital map 1 known in the prior art. The geographical area depicted by the digital map 1 is divided into adjacent regions 10, which may for example be individual countries. For the sake of clarity, only one of the regions 10 is provided with a reference sign. The regions 10 are configured in a rectangular shape in the schematic illustration of FIG. 1, but this is in no way mandatory. It is likewise not mandatory for the regions 10 to have the same size. Each region 10 is surrounded by a first boundary line 11 that forms the edge of the region 10. The surface area of the region 10 thus lies within the first boundary line 11.

Figure 2:
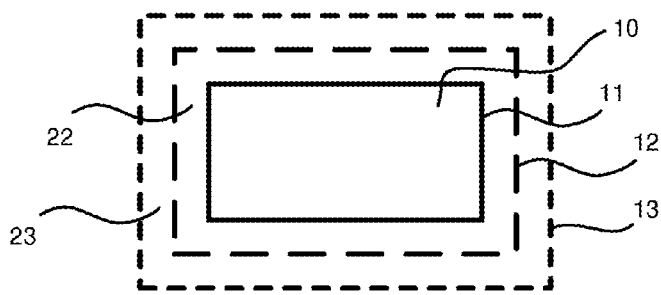
FIG. 2 shows a schematic illustration of a region of a digital map according to one embodiment of the invention.

FIG. 2 shows a schematic illustration of a region 10 of a digital map according to one embodiment of the invention. The illustrated region 10 may be a region 10 of the digital map 1 illustrated in FIG. 1. In other words, further adjacent regions 10 may adjoin the region 10 shown in FIG. 2, this however not being illustrated in FIG. 2 for the sake of clarity.

The region 10 has a first boundary line 11. The region 10 additionally has a second boundary line 12 that surrounds the region 10 at a greater distance than the first boundary line 11. An inner buffer zone 22 lies in the region between the boundary lines 11 and 12. The region 10 furthermore has a third boundary line 13 that surrounds the region 10 at a greater distance than the second boundary line 12. An outer buffer zone 23 lies in the region between the boundary lines 12 and 13. The region 10 is thus surrounded by two buffer zones 22, 23.

As shown in FIG. 1, a plurality of regions 10 of the digital map 1 may directly adjoin one another. In other words, the first boundary line 11 of a region 10 partly also forms the first boundary line 11 of an adjacent region 10. It is seen from the illustration of FIG. 2 that the buffer zones 22, 23, formed by the second boundary line 12 and third boundary line 13, of a region 10 lie within an adjacent region 10 or a plurality of adjacent regions 10.

Figure 3:
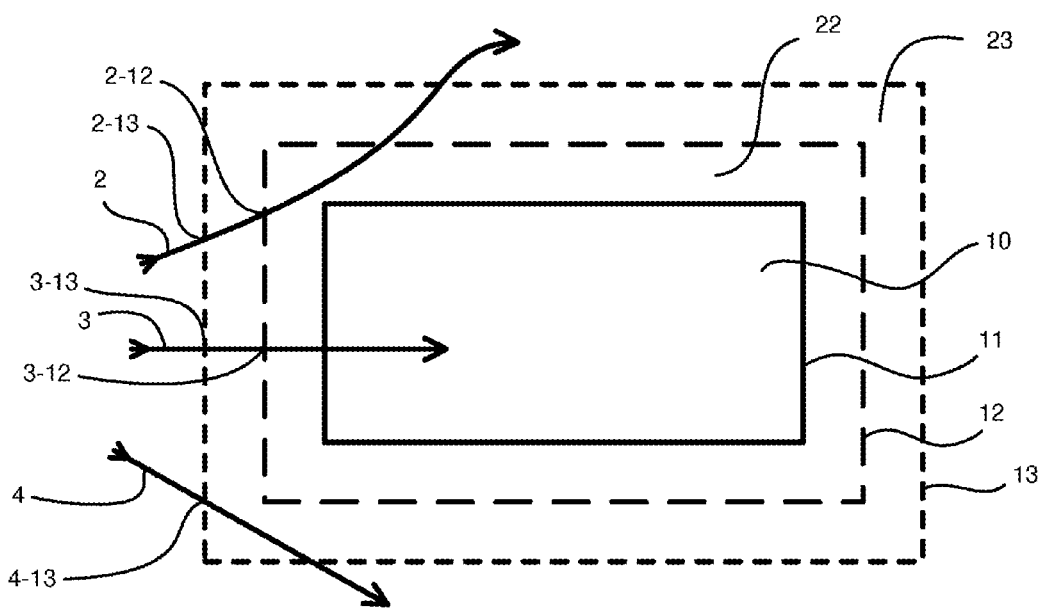
FIG. 3 shows a schematic illustration of a region of a digital map according to one embodiment of the invention with various movement trajectories of a navigation system according to one embodiment of the invention.

FIG. 3 adopts the illustration of the region 10 of the digital map 1 shown in FIG. 2. Three exemplary movement trajectories 2, 3, 4 of a navigation system according to one embodiment of the invention are additionally illustrated. The direction of movement of the trajectories 2, 3, 4 shown in FIG. 3 is identified by illustrations of arrows. This direction of movement may be checked as an additional condition when performing the method. However, this is not mandatory, because the requirement to update the digital map 1 also results from the further conditions without an explicit check of the direction of movement of the mobile navigation system.

Figure 4:
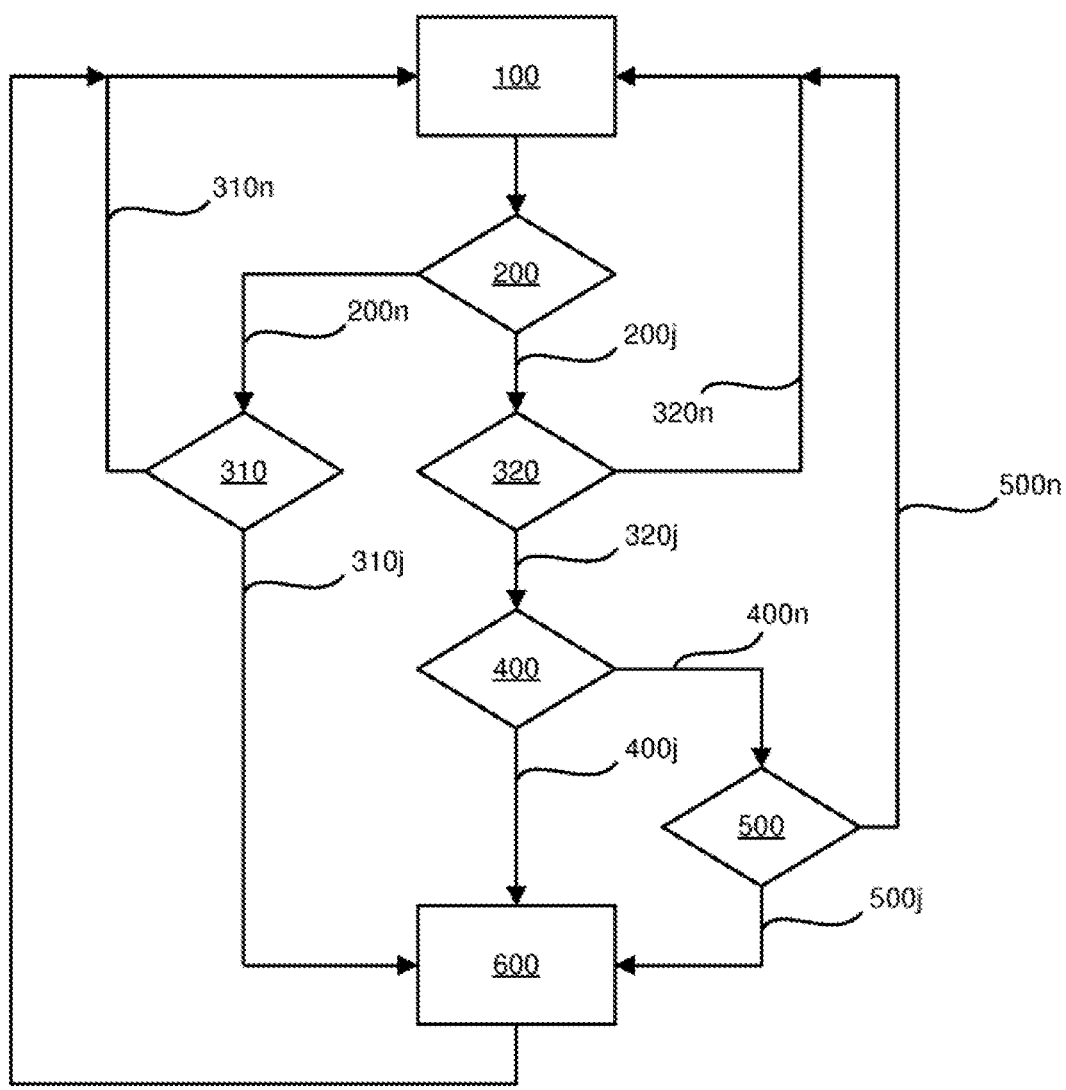
FIG. 4 shows a flowchart of one embodiment of the method according to the invention.

With reference to the flowchart, shown in FIG. 4, of one embodiment of the invention, the sequence of the method is intended to be explained below for each of the trajectories 2, 3, 4.

Example 2a), Movement Trajectory 2 without Activated Route Guidance

Consideration of the exemplary movement trajectory 2 begins at the start thereof illustrated in FIG. 3, that is to say outside the outer buffer zone 23 of the region 10. In method step 100, the geographical position of the navigation system is determined. In step 200, it is checked whether route guidance of the navigation system is active. This is not the case (branch 200n). In step 310, the first condition is checked as to whether the position of the navigation system lies on or within the second boundary line 12. This is not the case (branch 310n), and so the method ends. In the present example, there is provision to continue to execute the method, and so step 100 is then executed in the same way.

At a later time, the navigation system, on its movement along the trajectory 2, reaches the third boundary line 13 (position 2-13). However, due to route guidance not being activated in this example, this has no effect.

At an even later time, the navigation system, on its movement along the trajectory 2, reaches the second boundary line 12 (position 2-12). The position is again determined in step 100 and the activation of route guidance is checked (step 200, branch 200n).

The check 310 of the first condition as to whether the position 2-12 of the navigation system lies on or within the second boundary line 12 now has a positive result (branch 310j). The method is therefore continued with step 600, in which the map data for the region 10 are updated.

The movement trajectory 2 leads past the region 10, as a result of which an update of the map data for the region 10 would not have been necessary. However, in the present example, this was not foreseeably the case due to route guidance not being activated. Reaching the inner buffer zone 22 defined by the second boundary line 12 constitutes an indicator that the navigation system will have a high likelihood of moving into the region 10. For this reason, it makes sense to update the map data for the region 10.

Example 2b), Movement Trajectory 2 with Activated Route Guidance

Consideration of the exemplary movement trajectory 2 begins at the start thereof illustrated in FIG. 3, that is to say outside the buffer zone 23 of the region 10. In method step 100, the geographical position of the navigation system is determined. In step 200, it is checked whether route guidance of the navigation system is active. This is the case (branch 200j). In step 320, the first condition is checked as to whether the position of the navigation system lies on or within the third boundary line 13. This is not the case (branch 320n), and so the method ends. In the present example, there is provision to continue to execute the method, and so step 100 is then executed in the same way.

In comparison with example 2a) outlined first of all, it becomes clear that the check 310, 320 of the first condition is already performed at an earlier time when route guidance is activated. This therefore makes sense because, when route guidance is activated, there is a higher likelihood of traveling into the region 10. However, the planned further route (known due to activated route guidance) of the movement trajectory may additionally be taken into account as explained below.

At a later time, the navigation system, on its movement along the trajectory 2, reaches the third boundary line 13 (position 2-13). The position is again determined in step 100 and the activation of route guidance is checked (step 200, branch 200*j*). The check 320 of the first condition as to whether the position 2-13 of the navigation system lies on or within the third boundary line 13 now has a positive result (branch 320*j*).

The method is therefore continued with step 400. In this case, the third condition is checked as to whether the planned journey route 2 runs at least partly within the region 10. This is not satisfied (branch 400*n*), and so, next, in step 500, the fourth condition is checked as to whether the position of the navigation system lies on or within the first boundary line 11. This is not the case here (branch 500*n*), and so the method ends and restarts with step 100.

For the case (not shown in FIG. 3) in which the user of the navigation system deviates from the planned trajectory 2 and does move into the region 10, the check 500 as to the fourth condition would have a positive result (branch 500*j*) upon reaching the first boundary line 11. An update 600 of the map data would then be performed.

Example 3a), Movement Trajectory 3 without Activated Route Guidance

The entire method sequence is not intended to be explained in detail again, in order to avoid repetitions. Reference is made to the explanations in respect of examples 2a) and 2b).

In the example of the movement trajectory 3, the map data for the region 10 are updated 600 upon reaching the position 3-12 when route guidance is not activated. At this point 3-12, the method runs through the steps and branches having the following reference signs: 100, 200, 200*n*, 310, 310*j*, 600.

Example 3b), Movement Trajectory 3 with Activated Route Guidance

The entire method sequence is not intended to be explained in detail again, in order to avoid repetitions. Reference is made to the explanations in respect of examples 2a) and 2b).

In the example of the movement trajectory 3, the map data for the region 10 are updated 600 upon reaching the position 3-13 when route guidance is activated. At this point, the method initially runs through the already-described steps and branches having the following reference signs: 100, 200, 200*j*, 320, 320*j*.

The method is then continued with step 400. In this case, the third condition is checked as to whether the planned journey route 3 runs at least partly within the region 10. This is satisfied (branch 400*j*), and so, next, in step 600, the map data are updated.

Example 4a), Movement Trajectory 4 without Activated Route Guidance

The entire method sequence is not intended to be explained in detail again, in order to avoid repetitions. Reference is made to the explanations in respect of examples 2a) to 3b).

In the example of the movement trajectory 4, the map data for the region 10 are not updated 600 when route guidance is not activated. The method repeatedly runs through the steps and branches having the following reference signs: 100, 200, 200*n*, 310, 310*n*.

Example 4b), Movement Trajectory 4 with Activated Route Guidance

The entire method sequence is not intended to be explained in detail again, in order to avoid repetitions. Reference is made to the explanations in respect of examples 2a) to 3b).

In the example of the movement trajectory 4, the map data for the region 10 are not updated 600 when route guidance is activated. The method, until the position 4-13 is reached, runs through the already-described steps and branches having the following reference signs: 100, 200, 200*j*, 320, 320*n*.

Upon (and after) reaching the position 4-13, the method runs through the already-described steps and branches having the following reference signs: 100, 200, 200*j*, 320, 320*j*, 400, 400*n*, 500, 500*n*.

For the case (not shown in FIG. 3) in which the user of the navigation system deviates from the planned trajectory 4 and does move into the region 10, the check 500 as to the fourth condition would have a positive result (branch 500*j*) upon reaching the first boundary line 11. An update 600 of the map data would then be performed.

LIST OF REFERENCE SIGNS

1 digital map
10 regions of the digital map
11 boundary line of the region of the digital map
12 boundary line of the inner buffer zone of the region of the digital map
13 boundary line of the outer buffer zone of the region of the digital map
22 inner buffer zone of the region of the digital map
23 outer buffer zone of the region of the digital map
2, 3, 4 movement trajectories
x-y intersection of the journey trajectory x with the boundary line y
100-600 method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for updating a digital map of a navigation system of a motor vehicle, wherein a geographical area contained within the digital map is divided into a plurality of regions, the method comprising:
defining, for at least a region of the plurality of regions, a boundary zone as between a first boundary line directly surrounding the region and a second boundary line at least sectionally surrounding the region at a greater distance than the first boundary line, each of the plurality of regions corresponding to respective map data of the digital map;

determining a geographical position of the navigation system;

determining whether the position of the navigation system lies on or within the boundary zone; and in response to determining that the position of the navigation system lies on or within the boundary zone, updating the map data for the region.

2. The method according to claim 1, further comprising:

defining the second boundary line based on at least one property of a mobile data connection of the navigation system or of the motor vehicle and/or at least one property of the navigation system or of the motor vehicle.

3. The method according to claim 2, wherein the second boundary line is defined such that said updating is concluded at an expected time of reaching the first boundary line of the region.

4. The method according to claim 1, the method further comprising:

defining a further boundary zone as between the second boundary line a third boundary line that at least sectionally surrounds the region at a greater distance than the second boundary line;

determining whether route guidance of the navigation system is active;

in response to determining that route guidance is active, determining whether the position of the navigation system lies on or within the further boundary zone; and in response to determining that route guidance is not active, determining whether the position of the navigation system lies on or within the boundary zone.

5. The method according to claim 2, the method further comprising:

defining a further boundary zone as between the second boundary line a third boundary line that at least sectionally surrounds the region at a greater distance than the second boundary line;

determining whether route guidance of the navigation system is active;

in response to determining that route guidance is active, determining whether the position of the navigation system lies on or within the further boundary zone; and in response to determining that route guidance is not active, determining whether the position of the navigation system lies on or within the boundary zone.

6. The method according to claim 3, the method further comprising:

defining a further boundary zone as between the second boundary line a third boundary line that at least sectionally surrounds the region at a greater distance than the second boundary line;

determining whether route guidance of the navigation system is active;

in response to determining that route guidance is active, determining whether the position of the navigation system lies on or within the further boundary zone; and in response to determining that route guidance is not active, determining whether the position of the navigation system lies on or within the boundary zone.

7. The method according to claim 4, further comprising:

in response to determining that route guidance is active, determining whether a planned journey route runs at least partly within the region; and in response to determining that the planned route journey runs at least partially within the region, updating the map data for the corresponding region.

8. The method according to claim 5, further comprising:

in response to determining that route guidance is active, determining whether a planned journey route runs at least partly within the region; and in response to determining that the planned route journey runs at least partially within the region, updating the map data for the corresponding region.

9. The method according to claim 6, further comprising:

in response to determining that route guidance is active, determining whether a planned journey route runs at least partly within the region; and in response to determining that the planned route journey runs at least partially within the region, updating the map data for the corresponding region.

10. The method according to claim 7, further comprising:

in response to determining that the planned route journey runs at least partially within the region, determining whether the position of the navigation system lies on or within the the region; and in response to determining that the position of the navigation system lies on or within the region, updating the map data for the corresponding region.

11. The method according to claim 8, further comprising:

in response to determining that the planned route journey runs at least partially within the region, determining whether the position of the navigation system lies on or within the the region; and in response to determining that the position of the navigation system lies on or within the region, updating the map data for the corresponding region.

12. The method according to claim 9, further comprising:

in response to determining that the planned route journey runs at least partially within the region, determining whether the position of the navigation system lies on or within the the region; and in response to determining that the position of the navigation system lies on or within the region, updating the map data for the corresponding region.

13. A mobile navigation system having a digital map, wherein a geographical area contained within the digital map is divided into a plurality of regions, wherein the navigation system is configured to:

define, for at least a region of the plurality of regions, a boundary zone as between a first boundary line directly surrounding the region and a second boundary line at least sectionally surrounding the region at a greater distance than the first boundary line, each of the plurality of regions corresponding to respective map data of the digital map;

determine a geographical position of the navigation system;

determine whether the position of the navigation system lies on or within the boundary zone; and in response to determining that the position of the navigation system lies on or within the boundary zone, update the map data for the region.

14. A motor vehicle having a navigation system, wherein the navigation system is configured to:

define, for at least a region of the plurality of regions, a boundary zone as between a first boundary line directly surrounding the region and a second boundary line at least sectionally surrounding the region at a greater distance than the first boundary line, each of the plurality of regions corresponding to respective map data of the digital map;
determine a geographical position of the navigation system;
determine whether the position of the navigation system lies on or within the boundary zone; and
in response to determining that the position of the navigation system lies on or within the boundary zone, update the map data for the region.

* * * * *